United States Patent
Kobayashi (10) Patent No.: US 10,511,153 B2
(45) Date of Patent: Dec. 17, 2019

(54) SPARK PLUG

(71) Applicant: NGK SPARK PLUG CO., LTD., Nagoya-shi, Aichi (JP)

(72) Inventor: Tsutomu Kobayashi, Inazawa (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 16/260,909

(22) Filed: Jan. 29, 2019

(65) Prior Publication Data
US 2019/0252864 A1 Aug. 15, 2019

(30) Foreign Application Priority Data

Feb. 10, 2018 (JP) ................................ 2018-022598

(51) Int. Cl.
*H01T 13/32* (2006.01)
*H01T 13/39* (2006.01)

(52) U.S. Cl.
CPC .............. *H01T 13/32* (2013.01); *H01T 13/39* (2013.01)

(58) Field of Classification Search
CPC ....................................................... H01T 13/32
See application file for complete search history.

(56) References Cited

U.S. PATENT DOCUMENTS

| | | | |
|---|---|---|---|
| 6,533,628 B1 * | 3/2003 | Matsutani | H01T 21/02 219/121.64 |
| 9,257,817 B2 | 2/2016 | Suzuki | |
| 9,966,736 B2 | 5/2018 | Matsushita et al. | |
| 2013/0214670 A1 * | 8/2013 | Suzuki | H01T 13/32 313/141 |
| 2013/0320835 A1 * | 12/2013 | Kowalski | H01T 13/39 313/141 |
| 2014/0111078 A1 * | 4/2014 | Kowalski | H01T 13/39 313/141 |
| 2015/0145402 A1 * | 5/2015 | Hasegawa | H01T 13/32 313/140 |
| 2017/0294763 A1 * | 10/2017 | Matsushita | H01T 13/08 |
| 2019/0214795 A1 * | 7/2019 | Tamura | H01T 13/20 |

FOREIGN PATENT DOCUMENTS

| | | |
|---|---|---|
| JP | 2017-191655 | 10/2017 |
| WO | WO 2012/067199 A1 | 5/2012 |

* cited by examiner

*Primary Examiner* — Donald L Raleigh
(74) *Attorney, Agent, or Firm* — Kusner & Jaffe (57) ABSTRACT

A spark plug includes a ground electrode and a center electrode, at least one of which includes an electrode body, an electrode tip, and a weld part formed therebetween. The weld part has an orthogonal projection on a virtual plane perpendicular to a layering direction of the electrode body and the electrode tip. The orthogonal projection includes projecting portions extending in a specific direction. The weld part satisfies a condition that a first line segment is shorter than a second line segment, wherein: the first line segment is a virtual line segment connecting peaks of adjacent two projecting portions; and the second line segment is a virtual line segment that is perpendicular to the first line segment and connects the first line segment to an outer periphery of the weld part at a point farthest from the first line segment.

12 Claims, 8 Drawing Sheets

SECTION CF

FIG. 2B

VIRTUAL PLANE VS

VIRTUAL PLANE VSb

FIG. 7

VIRTUAL PLANE VSc

FIG. 8

SPARK PLUG

FIELD OF THE INVENTION

The present invention relates to a spark plug used for ignition of fuel gas in an internal combustion engine or the like.

BACKGROUND OF THE INVENTION

International Patent Application Publication WO2012/067199, corresponding to U.S. Pat. No. 9,257,817 B2, discloses a spark plug, which includes a spark-generating part employing an electrode tip made of a noble metal durable against spark generation. This document discloses a process for joining the electrode tip to an electrode body by laser welding, while forming a weld part between their contact surfaces, wherein the weld part has a variation of shape. For enhancement of strength of joint between the electrode tip and the electrode body, this joint is implemented by joining the entire contact surfaces of these components.

However, joining the entire contact surfaces between the electrode tip and the electrode body by laser welding tends to cause an increase in amount of a melted portion of material and thereby cause the electrode tip to tilt or sink during the laser welding. This may cause so-called welding drop under some conditions. The welding drop can cause a problem such as failure of ignition and decay of durability, when adhered to a surface of the electrode.

In view of the foregoing, for welding the electrode tip and the electrode body of the spark plug, it is desirable to enhance the joint strength while suppressing the occurrence of welding drop.

SUMMARY OF THE INVENTION

According to one aspect of the present invention, there is provided a spark plug comprising a ground electrode and a center electrode, wherein: at least one of the ground electrode and the center electrode, as a first electrode, includes an electrode body, an electrode tip layered with the electrode body in a layering direction, and a weld part formed between the electrode body and the electrode tip; the weld part has an orthogonal projection on a virtual plane perpendicular to the layering direction, wherein the orthogonal projection includes a plurality of projecting portions extending in a specific direction and being arranged in a direction perpendicular to the specific direction, wherein each of the plurality of projecting portions includes a peak in the specific direction; the weld part satisfies a mathematical expression of B>A, where A represents a length of a first line segment, and B represents a length of a second line segment; the first line segment is a virtual line segment connecting the peak of a first one of the plurality of projecting portions to the peak of a second one of the plurality of projecting portions adjacent to the first projecting portion; and the second line segment is a virtual line segment that is perpendicular to the first line segment and connects the first line segment to a point of an outer periphery of the weld part, wherein the point is farthest from the first line segment in a section between the peaks of the first and second projecting portions facing the first line segment.

DETAILED DESCRIPTION OF THE INVENTION

<Configuration of Spark Plug>

Figure 1:
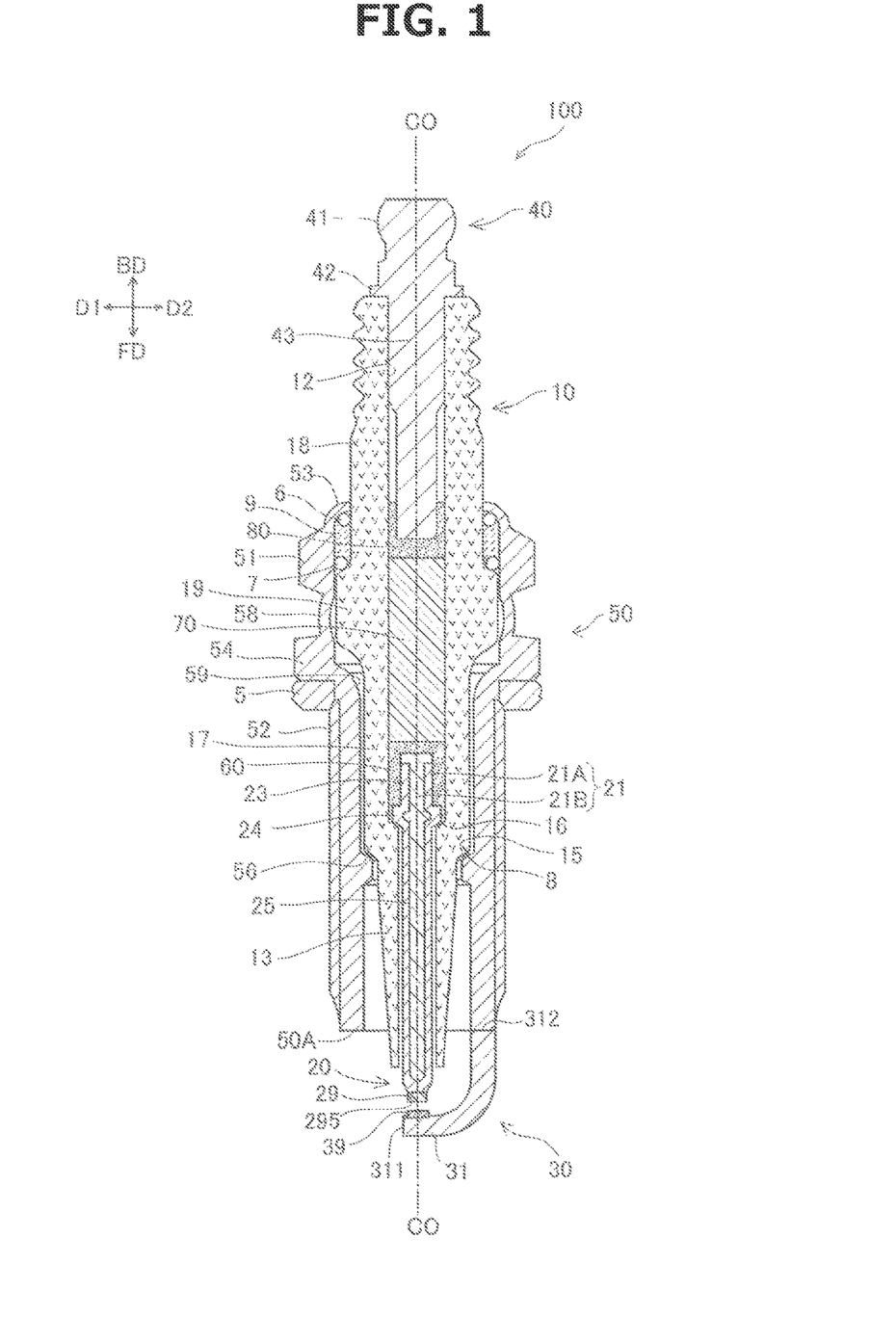
FIG. 1 is a longitudinal sectional view of a spark plug 100 according to an exemplary embodiment of the present invention.

FIG. 1 shows a spark plug 100 in longitudinal sectional view, according to an exemplary embodiment of the present invention. In FIG. 1, a one-dot broken line CO represents a longitudinal axis of the spark plug 100, and defines an axial direction of the spark plug 100. The axis CO also defines a radial direction and a circumferential direction of the spark plug 100 by a radial direction and a circumferential direction of an imaginary circle around the axis CO. In FIG. 1, a lower side and an upper side are respectively referred to also as "front side" and "rear side" of the spark plug 100. Accordingly, a downward direction and an upward direction in FIG. 1 are respectively referred to also as "frontward direction FD" and "rearward direction BD" of the spark plug 100.

The spark plug 100 includes an insulator 10, a center electrode 20, a ground electrode 30, a metal terminal 40, and a metal body or shell 50. The spark plug 100 is structured to generate a spark discharge in a gap between the center electrode 20 and the ground electrode 30 (i.e. spark gap), and be mounted on an internal combustion engine not shown, and employed to ignite fuel gas in a combustion chamber of the internal combustion engine.

The insulator 10 is formed by sintering a material such as alumina, and has a substantially cylindrical shape extending in the axial direction and including an axial hole 12, wherein the axial hole 12 extends through the insulator 10 in the axial direction. The insulator 10 includes a collar portion 19, a rear body portion 18, a front body portion 17, a step portion 15, and a leg portion 13. The rear body portion 18 is located rearward of the collar portion 19 and has an outer diameter smaller than that of the collar portion 19. The front body portion 17 is located frontward of the collar portion 19 and has an outer diameter smaller than that of the collar portion 19. The leg portion 13 is located frontward of the front body portion 17 and has an outer diameter smaller than that of the front body portion 17. The leg portion 13 is structured to project into and be exposed to the combustion chamber of the internal combustion engine, when the spark plug 100 is mounted on the internal combustion engine. The step portion 15 is formed between the leg portion 13 and the front body portion 17 for connection therebetween.

The metal shell 50 is made of a conductive metal material such as low-carbon steel, has a cylindrical shape, and serves as a member fixing the spark plug 100 to a cylinder head not shown of the internal combustion engine. The metal shell 50 includes a through hole 59, wherein the through hole 59 extends through the metal shell 50 along the axis CO. The metal shell 50 is located radially outside of and surrounds an outer periphery of the insulator 10. Thus, the insulator 10 is inserted and held in the through hole 59 of the metal shell 50. The insulator 10 includes a rear end projecting rearward with respect to a rear end of the metal shell 50.

The metal shell 50 includes a tool engagement portion 51, a mounting thread portion 52, and a seat portion 54. The tool engagement portion 51 has a hexagonal prism shape and is structured to engage with a spark plug wrench not shown. The mounting thread portion 52 is structured to be mounted to the internal combustion engine. The seat portion 54 has a collar shape and is formed between the engagement portion 51 and the mounting thread portion 52. The mounting thread portion 52 has a nominal diameter of M8 (i.e. 8 mm), M10, M12, M14, or M18, for example.

The metal shell 50 is provided with a gasket 5, wherein the gasket 5 is formed by bending a metal plate to have an annular shape and is fitted on a portion between the mounting thread portion 52 and the seat portion 54 of the metal shell 50. The gasket 5 is structured to seal a gap between the spark plug 100 and the cylinder head of the internal combustion engine when the spark plug 100 is mounted on the internal combustion engine.

The metal shell 50 further includes: a thin crimp portion 53 provided at a rear end of the tool engagement portion 51; and a thin compression deformation portion 58 provided between the seat portion 54 and the tool engagement portion 51. Annular ring members 6 and 7 are provided in an annular space formed between an outer peripheral surface of the rear body portion 18 of the insulator 10 and an inner peripheral surface of the tool engagement portion 51 and the crimp portion 53 of the metal shell 50. The annular space between the ring members 6 and 7 is filled with talc powder 9. The crimp portion 53 includes a rear end crimped inward in the radial direction and fixed to the outer peripheral surface of the insulator 10. The compression deformation portion 58 of the metal shell 50 is compressed and deformed by depressing the crimp portion 53, which is fixed on the outer peripheral surface of the insulator 10, toward the front side, during production of the spark plug 100. This compression deformation of the compression deformation portion 58 causes depression of the insulator 10 toward the front side via the ring members 6 and 7 and the talc powder 9 inside the metal shell 50. This brings the step portion 15 of the insulator 10 into press contact with a step portion 56 of the metal shell 50 via an annual plate packing 8 of metal, wherein the step portion 56 is formed in an inner periphery of the mounting thread portion 52, and thereby prevents gas in the combustion chamber from leaking through a gap between the metal shell 50 and the insulator 10.

The center electrode 20 includes a center electrode body 21 and a center electrode tip 29. The center electrode body 21 has a rod shape extending in the axial direction, and is held in a front end part of the axial hole 12 of the insulator 10. The center electrode body 21 includes an electrode base member 21A and an electrode core member 21B embedded in the electrode base member 21A. The electrode base member 21A is made of nickel or nickel-based alloy such as NCF600 or NCF601. The electrode core member 21B is made of copper or copper-based alloy which has higher thermal conductivity than the material of the electrode base member 21A. The present embodiment employs copper for the electrode core member 21B.

The center electrode body 21 includes an electrode collar portion (or electrode flange portion) 24, an electrode head portion 23, and an electrode leg portion 25. The electrode collar portion 24 is located at a specific position of the center electrode body 21 in the axial direction and supported by the step portion 16 of the insulator 10. The electrode head portion 23 and the electrode leg portion 25 are respectively a rearward part and a frontward part of the center electrode body 21 with respect to the electrode collar portion 24. The electrode leg portion 25 includes a front end (i.e. front end of the center electrode body 21) projecting frontward with respect to a front end of the insulator 10.

The center electrode tip 29 has a substantially cylindrical shape and is joined to the front end of the center electrode body 21 (i.e. the front end of the electrode leg portion 25) by laser welding etc. The center electrode tip 29 includes a front-end surface which serves as a first discharge surface 295 to generate the spark gap between the first discharge surface 295 surface and a ground electrode tip 39 described below. The center electrode tip 29 is a noble-metal tip made of a high-melting-point noble metal such as iridium or an alloy containing such noble metal as a main component.

The ground electrode 30 includes the ground electrode tip 39 having a rectangular prism shape, and a ground electrode body 31 having a bent rod shape having a rectangular cross section. The ground electrode body 31 includes a free end 311 and a joint end 312 as its longitudinal ends, and is joined to a front-end surface 50A of the metal shell 50 via the joint end 312 by resistance welding etc. This joint electrically connects the ground electrode body 31 and the metal shell 50.

The ground electrode body 31 is made of nickel or nickel-based alloy such as NCF600 or NCF601. The ground electrode body 31 may include a bilayer structure composed of a base member and a core member embedded therein, wherein the base member is made of a high-corrosion-resistance metal such as nickel alloy, and the core member is made of a high-thermal-conductivity metal such as copper. Similar to the center electrode tip 29, the ground electrode tip 39 is a noble-metal tip made of a high-melting-point noble metal such as iridium or an alloy containing such noble metal as a main component.

The metal terminal 40 has a rod shape extending in the axial direction, and is made of a conductive metal material such as low-carbon steel, and wears a metal layer such as a nickel layer for anticorrosion which is formed on its surface by plating etc. The metal terminal 40 includes a terminal collar portion 42, a cap attachment portion 41, and a terminal leg portion 43. The terminal collar portion 42 is located at a specific position of the metal terminal 40 in the axial direction. The cap attachment portion 41 and the terminal leg portion 43 are respectively located rearward and frontward of the terminal collar portion 42. The cap attachment portion 41 is structured to project rearward with respect to the rear end of the insulator 10 and thereby be exposed to the outside of the insulator 10, and receive attachment of a plug cap not shown connected to a high-voltage cable not shown, and receive a high voltage for generating the spark discharge. The terminal leg portion 43 is inserted in the axial hole 12 of the insulator 10.

In the axial hole 12 of the insulator 10, a resistor 70 is provided between a front end of the terminal leg portion 43 of the metal terminal 40 and a rear end of the electrode head portion 23 of the center electrode 20, to suppress radio noise from being caused by generation of the spark discharge. The resistor 70 is made of a composition including glass particles as a major component, other ceramic particles, and a conductive material, for example. In the axial hole 12, the resistor 70 and the center electrode 20 have a gap therebetween, wherein the gap is filled with a conductive seal 60. Similarly, the resistor 70 and the metal terminal 40 have a gap therebetween, wherein the gap is filled with a conductive seal 80. The conductive seals 60 and 80 are each made of a composition including $B_2O_3$—$SiO_2$-based glass particles and particles of metal such as Cu or Fe, for example.

<Configuration of Ground Electrode Tip 39 and its Vicinity of Ground Electrode 30>

Figure 2A:
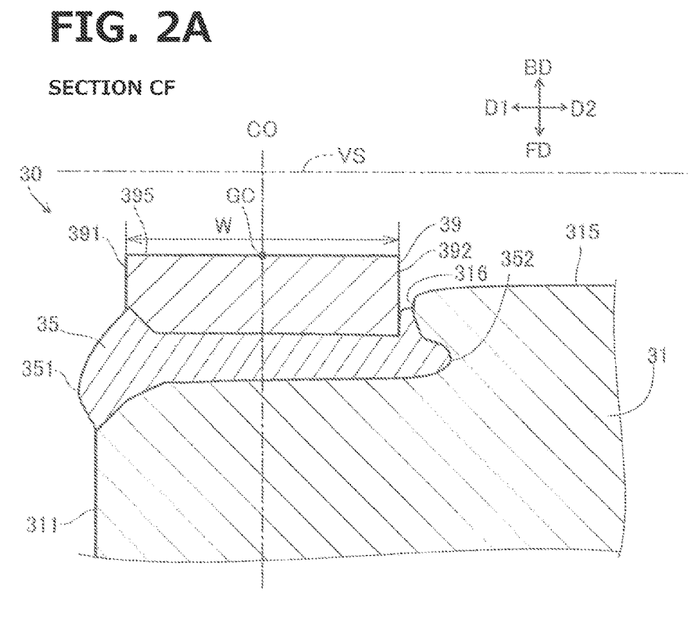
FIG. 2A is an enlarged sectional view of a part of the spark plug 100 including a ground electrode tip 39 of a ground electrode 30.
Figure 2B:
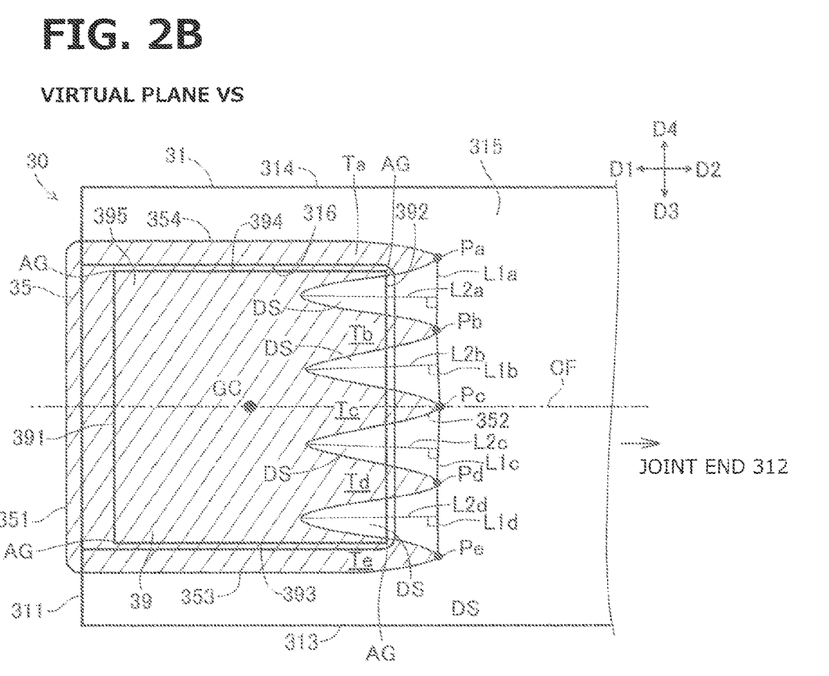
FIG. 2B is an enlarged plan view of the part of the spark plug 100.

The following details configuration of the ground electrode tip 39 and its vicinity of the ground electrode 30 according to the exemplary embodiment with reference to FIGS. 2A and 2B. FIG. 2A shows a section CF of the ground electrode tip 39 and its vicinity taken by a specific plane. The ground electrode tip 39 includes a rear-end surface as a second discharge surface 395 facing the first discharge surface 295 (see FIG. 1) of the center electrode tip 29. The section CF crosses a barycenter GC of the second discharge surface 395, and is perpendicular to the second discharge surface 395, and is parallel to a longitudinal axis of the rod-shaped ground electrode body 31. In other words, the section CF extends along the axis CO of the spark plug 100 and is parallel to the axis of the ground electrode body 31, because the axis CO is a line which crosses the barycenter GC of the second discharge surface 395 and is perpendicular to the second discharge surface 395. The ground electrode tip 39 and the ground electrode body 31 are layered together in the axial direction of the spark plug 100. Accordingly, the axial direction of the spark plug 100 is also referred to as a layering direction of the ground electrode tip 39 and the ground electrode body 31.

FIG. 2B shows orthogonal projections of the ground electrode body 31, the ground electrode tip 39, and a weld part 35 described below, on a virtual plane VS shown in FIG. 2A which is perpendicular to the layering direction (i.e. the axial direction of the spark plug 100 in the present embodiment). In other words, FIG. 2B shows the ground electrode body 31, the ground electrode tip 39, and the weld part 35 as transparently viewed in the layering direction. In the following description, the orthogonal projection of each component on the virtual plane VS is simply referred to as the component itself (in its orthogonal projection).

In FIG. 2B, the section CF in FIG. 2A is drawn as a one-dot broken line. In FIGS. 2A and 2B, a leftward direction and a rightward direction are respectively referred to as a first direction D1 and a second direction D2. The first direction D1 is a direction from the barycenter GC of the second discharge surface 395 toward the free end 311 of the ground electrode body 31 along the second discharge surface 395. The second direction D2 is opposite to the first direction D1.

The ground electrode body 31 includes four side surfaces crossing a plane of the free end 311. Out of these four side surfaces, a side surface facing the first discharge surface 295 of the center electrode 20 is referred to as a surface 315; and two side surfaces crossing the surface 315, i.e. a lower side surface and an upper side surface of the ground electrode body 31 in FIG. 2B, are respectively referred to as surfaces 313 and 314. In FIG. 2B, a downward direction and an upward direction are respectively referred to as a third direction D3 and a fourth direction D4. The third direction D3 is a direction from the barycenter GC of the second discharge surface 395 toward the surface 313. The fourth direction D4 is opposite to the third direction D3.

The ground electrode tip 39 is a plate member having a rectangular shape (square in the present embodiment) as viewed in the layering direction of the ground electrode tip 39 and the ground electrode body 31. Each side of the rectangular shape has a length of 1.5 mm to 2.0 mm, i.e. the ground electrode tip 39 has a size of 1.5 mm to 2.0 mm in each of the first direction D1 and the third direction D3, for example. The ground electrode tip 39 has an average thickness or size of 0.2 mm to 1.0 mm in the axial direction, for example.

The ground electrode tip 39 is located along the surface 315 in a vicinity of the free end 311 of the ground electrode body 31. Specifically, the ground electrode body 31 includes a recess 316 in the vicinity of the free end 311, wherein the recess 316 is formed with an offset in the frontward direction FD with respect to the surface 315. The recess 316 faces and receives a frontward part of the ground electrode tip 39, i.e. a part of the ground electrode tip 39 opposite to the second discharge surface 395. The second discharge surface 395 of the ground electrode tip 39 is located with an offset in the rearward direction BD with respect to the surface 315. As shown in FIG. 2B, as viewed in the axial direction, the recess 316 has a shape substantially similar to and slightly larger than the shape of the ground electrode tip 39, wherein the recess 316 and the ground electrode tip 39 have square shapes in the present embodiment.

As shown in the section CF of FIG. 2A, the ground electrode tip 39 includes a side surface 391 in the first direction D1, wherein the surface 391 is located apart in the second direction D2 from the free end 311 of the ground electrode body 31, and is parallel to the free end 311.

The ground electrode tip 39 is welded on the ground electrode body 31 by laser welding. The laser welding forms the weld part 35 between the ground electrode tip 39 and the ground electrode body 31. The formation of the weld part 35 is implemented by melting by laser welding and thereafter solidifying a part of a workpiece of the ground electrode tip 39 before welded and a part of a workpiece of the ground electrode body 31 before welded. Accordingly, the weld part 35 is composed of components of the ground electrode tip 39 and components of the ground electrode body 31. The weld part 35 may be also referred to as a joint part joining the ground electrode tip 39 and the ground electrode body 31, or a weld bead joining the ground electrode tip 39 and the ground electrode body 31.

In FIG. 2B, a hatched area represents the weld part 35 projected onto the virtual plane VS. In the virtual plane VS, the weld part 35 includes three outer edges 351, 353, and 354 respectively in the directions D1, D3, and D4. The edges 351, 353, and 354 are respectively located in parallel with corresponding side surfaces 391, 393, and 394 of the ground electrode tip 39, and outside of the corresponding side surfaces 391, 393, and 394.

In the virtual plane VS, the weld part 35 further includes an outer edge 352 in the second direction D2. The edge 352 has a wavy shape crossing at a plurality of points a corresponding side surface 392 of the ground electrode tip 39 in the second direction D2. In other words, the weld part 35 includes a plurality of projecting portions Ta to Te on the second direction D2 side. The projecting portions Ta to Te extend in a specific direction in the virtual plane VS, i.e. in the second direction D2, and are arranged in the third direction D3. In FIG. 2B, points Pa to Pe represent peaks Pa to Pe of the projecting portions Ta to Te in the second direction D2.

Naturally, the five projecting portions Ta to Te include four pairs of adjacent two projecting portions, i.e. the pair of the projecting portions Ta and Tb, the pair of the projecting portions Tb and Tc, the pair of the projecting portions Tc and Td, and the pair of the projecting portions Td and Te. For each of the four pairs, a first line segment is defined as a virtual line segment L1a to L1d connecting the peaks of the corresponding two projecting portions. The first line segments L1a to L1d have lengths Aa to Ad respectively.

Furthermore, as shown in FIG. 2B, in the virtual plane VS, a second line segment L2a corresponding to the first line segment L1a is defined as the longest one of line segments each drawn to be perpendicular to the first line segment L1a and connect a point on the first line segment L1a and a point on an outer periphery of the weld part 35. In other words, the second line segment L2a is defined as a line segment that is perpendicular to the first line segment L1a and connects the first line segment L1a to a point of an outer periphery of the weld part 35, wherein the point is farthest from the first line segment L1a between the peaks of the corresponding two projecting portions. In the same way, each of second line segments L2b to L2d corresponding to the first line segments L1b to L1d is defined as a line segment that is perpendicular to the corresponding first line segment and connects the corresponding first line segment to a point of the outer periphery of the weld part 35, wherein the point is farthest from the corresponding first line segment between the peaks of the corresponding two projecting portions. The second line segments L2a to L2d have lengths Ba to Bd respectively.

Regarding the pair of the projecting portions Ta and Tb, the length Ba of the second line segment L2a is greater than the length Aa of the first line segment L1a. Namely, this pair satisfies a mathematical expression of Ba>Aa.

In the same way, regarding the pair of the projecting portions Tb and Tc, the pair of the projecting portions Tc and Td, and the pair of the projecting portions Td and Te, the lengths Bb, Bc, and Bd of the second line segments L2b, L2c, and L2d are respectively greater than the lengths Ab, Ac, and Ad of the first line segments L1b, L1c, and L1d. Namely, these pairs satisfy mathematical expressions of Bb>Ab, Bc>Ac, and Bd>Ad.

The weld part 35 includes a surface in the rearward direction BD which is in contact with the ground electrode tip 39, and a surface in the frontward direction FD which is in contact with the ground electrode body 31. Thus, the ground electrode tip 39 and the ground electrode body 31 are welded together via the weld part 35.

As shown in FIG. 2A, the weld part 35 includes the edge 351 (also referred to as exposed edge 351) in the first direction D1, wherein the edge 351 bulges and is exposed to the outside at the free end 311 of the ground electrode body 31. On the other hand, the edges 352, 353, and 354 of the weld part 35 in the directions D2, D3, D4 are not exposed to the outside at surfaces of the ground electrode body 31 such as the surfaces 313 and 314. This is because the laser welding for formation of the weld part 35 employs a laser beam applied to the free end 311 in the second direction D2. As shown in FIG. 2A, the weld part 35 has a thickness (i.e. a length in the axial direction) which is greater in a vicinity of the exposed edge 351 than in the remaining part and substantially constant in that remaining part.

In the virtual plane VS, the second direction D2 (i.e. the rightward direction in FIG. 2B), which is the specific direction in which the projecting portions Ta to Te extend, is directed toward the joint end 312 of the ground electrode body 31.

Furthermore, in the virtual plane VS, the peaks Pa to Pe of the projecting portions Ta to Te are located on the second direction D2 side of the surface 392 of the ground electrode tip 39, wherein the surface 392 is an end of the ground electrode tip 39 in the second direction D2. Thus, the peaks Pa to Pe overlap with the ground electrode body 31 and do not overlap with the ground electrode tip 39.

Moreover, in the virtual plane VS, the projecting portions Ta and Tb have an area DS therebetween in which the ground electrode tip 39 and the ground electrode body 31 overlap with each other. In the same way, each of the pair of the projecting portion Tb and Tc, the pair of the projecting portions Tc and Td, and the pair of the projecting portions Td and Te has an area DS therebetween in which the ground electrode tip 39 and the ground electrode body 31 overlap with each other. In the areas DS, the ground electrode tip 39 and the ground electrode body 31 are in direct contact with each other, without sandwiching the weld part 35 therebetween. With the areas DS provided, the layering direction of the ground electrode tip 39 and the ground electrode body 31 is a direction perpendicular to their contact surfaces in the areas DS.

Furthermore, in the virtual plane VS, the rectangular shape of the ground electrode tip 39 includes four corners AG overlapping with the weld part 35.

<Production Process>

Figure 3:
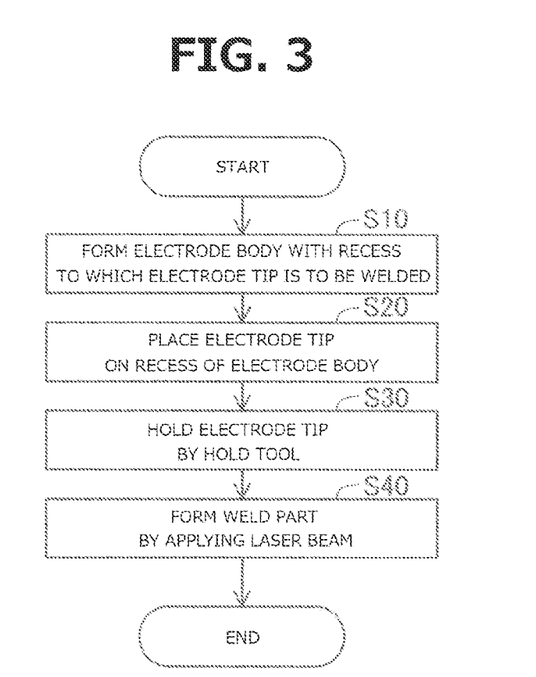
FIG. 3 is a flow chart showing a process for producing the ground electrode 30.
Figure 4A:
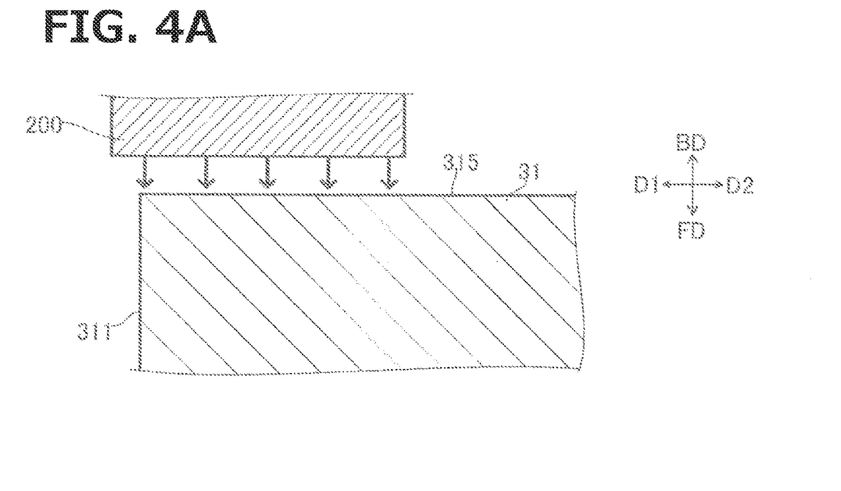
FIGS. 4A, 4B, and 4C are illustrative views showing the process for producing the ground electrode 30.
Figure 4B:
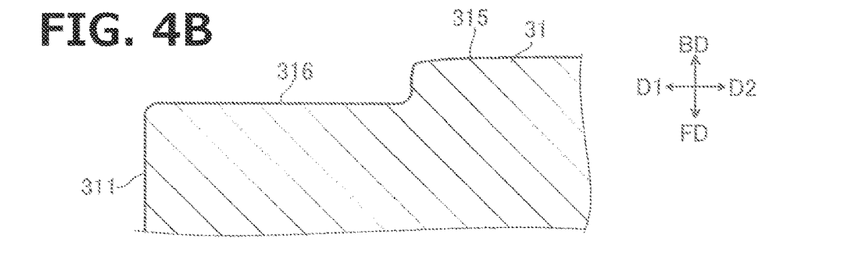
Figure 4C:
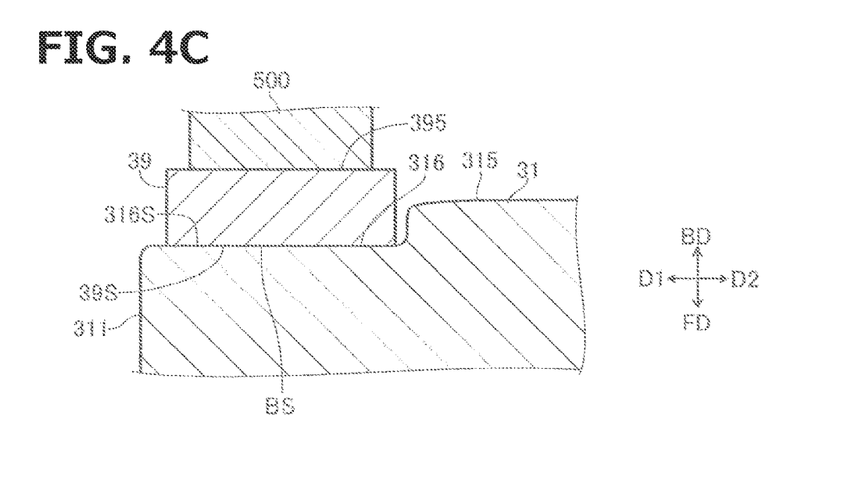

The following describes a process for producing the spark plug 100, especially a process for producing the ground electrode 30, with reference to a flowchart of FIG. 3 and illustrative views of FIGS. 4A, 4B, and 4C. The process is started by preparing a workpiece of the rod-shaped ground electrode body 31 before bent, and a workpiece of the ground electrode tip 39 before welded on the ground electrode body 31.

At step S10 in FIG. 3, the recess 316 is formed on the side surface 315 of the ground electrode body 31, wherein the ground electrode tip 39 is to be welded to the recess 316. Specifically, as shown in FIG. 4A, this formation is implemented by pressing a press tool 200 onto a part of the surface 315 in the vicinity of the free end 311, for example, by a press machine, wherein the press tool 200 has a shape corresponding to the recess 316. The recess 316 is thus formed as shown in FIG. 4B.

At step S20, as shown in FIG. 4C, the workpiece of the ground electrode tip 39 before welded, which has a rectangular prism-shape, is placed on the recess 316 of the ground electrode body 31. In this situation, the frontward surface 39S of the ground electrode tip 39 is in contact with a bottom surface 316S of the recess 316.

At step S30, the ground electrode tip 39 is pressed to and held on the ground electrode body 31 by a hold tool 500. Specifically, as shown in FIG. 4C, the hold tool 500 presses the second discharging surface 395 of the ground electrode tip 39 in the frontward direction FD (downward in FIG. 4C). Thus, the ground electrode tip 39 and the ground electrode body 31 are held on each other, with the frontward surface 39S of the ground electrode tip 39 and the bottom surface 316S of the recess 316 in contact with each other.

Figure 5A:
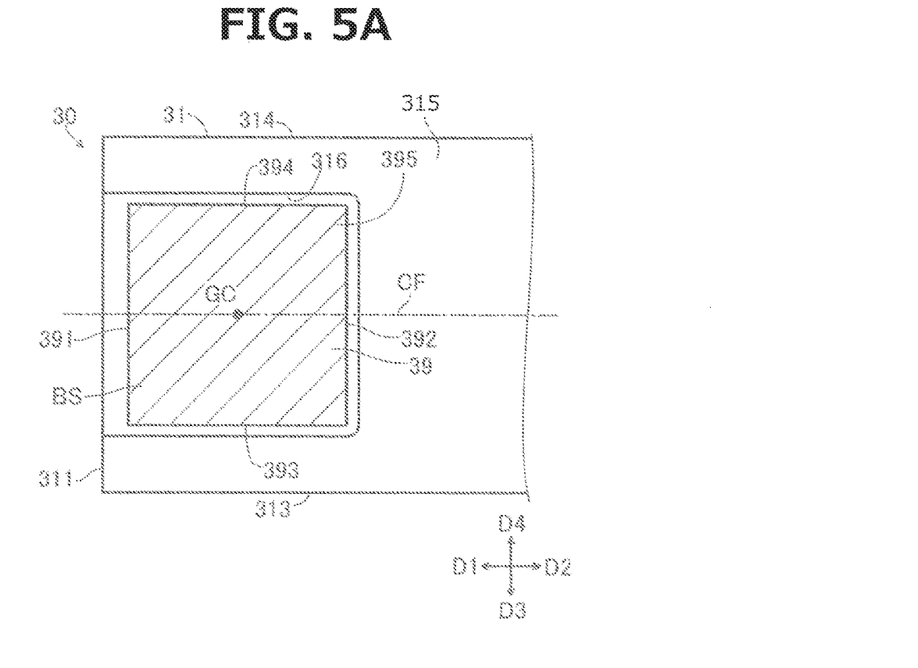
FIGS. 5A and 5B are illustrative views showing how the ground electrode tip 39 and a ground electrode body 31 of the ground electrode 30 are in contact with each other at step S30 in FIG. 3.
Figure 5B:
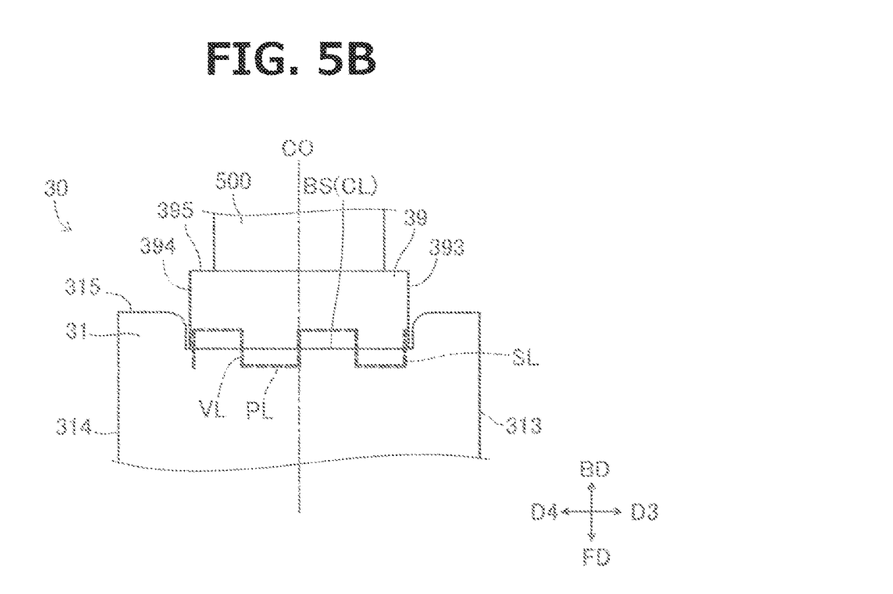

FIGS. 5A and 5B illustrate how the ground electrode tip 39 and the ground electrode body 31 of the ground electrode 30 are in contact with each other. FIG. 5A shows the second discharge surface 395 of the ground electrode tip 39 and its vicinity at step S30, as viewed in the frontward direction FD. FIG. 5B shows the ground electrode tip 39 and its vicinity, as viewed in the second direction D2. In FIG. 5A, a hatched area represents an area of contact between the frontward surface 39S of the ground electrode tip 39 and the bottom surface 316S of the recess 316 at step S30, which is referred to as tip contact area BS, in which the ground electrode tip 39 and the ground electrode body 31 are to be welded and joined to each other. In FIG. 5B, the tip contact area BS is represented by a line segment, which is referred to as tip contact line CL.

At step S40, a welding process is implemented by laser welding. Specifically, the welding process is implemented by applying a laser beam to the tip contact line CL and its vicinity, to form the weld part 35 and weld the ground electrode tip 39 to the ground electrode body 31. The present embodiment employs a fiber laser for the laser welding. The fiber laser has high light-gathering ability, for example, as compared to Yttrium Aluminum Garnet (YAG) laser, and therefore can more flexibly shape the weld part 35. This allows the weld part 35 to have a shape relatively small in the thickness in the axial direction and relatively long in the first direction D1 perpendicular to the axial direction, as shown in FIG. 2A.

In FIG. 5B, a bold broken line represents a scan line SL along which the laser beam is delivered during the laser welding process. The laser beam moves along the scan line SL at a predetermined constant speed with a predetermined constant output power (energy per unit time) during scanning. Accordingly, the scan line SL is irradiated with a constant energy per unit length. As shown in FIG. 5B, the scan line SL includes four parallel scan line sections PL parallel to the tip contact line CL, and five perpendicular scan line sections VL perpendicular to the tip contact line CL, wherein the parallel scan line sections PL and the perpendicular scan line sections VL are alternately arranged along the scan line SL. In the third direction D3, the five perpendicular scan line sections VL correspond in position to the five projecting portions Ta to Te. Accordingly, the tip contact line CL receives greater energy per unit length at the positions of the perpendicular scan line sections VL than at positions of the parallel scan line sections PL, in the third direction D3. This results in formation of the projecting portions Ta to Te corresponding in position in the third direction D3 to the perpendicular scan line sections VL.

According to the present embodiment described above, the weld part 35 satisfies the condition of Ba>Aa in the virtual plane VS, wherein: Aa is the length of the first line segment L1a drawn to connect the peaks Pa and Pb of the two projecting portions Ta and Tb in the specific direction (second direction D2), out of the five projecting portions Ta to Te extending in the specific direction; and Ba is the length of the second line segment L2a that is the longest one of line segments each drawn to be perpendicular to the first line segment L1a and connect a point on the first line segment L1a and a point on the outer periphery of the weld part 35.

The satisfaction of that condition enhances complexity of shapes of contact areas between the weld part 35 and the ground electrode body 31 and between the weld part 35 and the ground electrode tip 39, and thereby increases sizes of the contact areas without an excessive increase in volume of the weld part 35. This serves to enhance strength of joint between the ground electrode tip 39 and the ground electrode body 31 while suppressing the occurrence of so-called welding drop.

Specifically, an excessive increase in the volume of the weld part 35 might cause a problem of welding drop that a portion of the weld part 35 in melted state is pushed out of location between the ground electrode tip 39 and the ground electrode body 31, and adheres to the second discharge surface 395 and its vicinity of the ground electrode tip 39. On the other hand, a decrease in the volume of the weld part 35 tends to result in a decrease in the sizes of the contact areas between the weld part 35 and the ground electrode body 31 and between the weld part 35 and the ground electrode tip 39, and a decrease in the strength of joint between the ground electrode tip 39 and the ground electrode body 31. The decrease in the strength of joint might cause a problem such as a problem of detachment of the ground electrode tip 39. Such a problem is suppressed according to the present embodiment.

The ground electrode tip 39 gets a high temperature when used. Therefore, for reduction of consumption of the ground electrode tip 39 to achieve a long life of the spark plug 100, the spark plug 100 is preferred to have an improved heat-dissipation ability to conduct heat from the ground electrode tip 39 to the metal shell 50 via the ground electrode body 31. According to the present embodiment, the specific direction (second direction D2) in which the projecting portions Ta to Te extend is directed toward the joint end 312, when the ground electrode body 31 is further projected in the layering direction onto the virtual plane VS in FIG. 2B. This structure serves to increase the sizes of the contact areas among the ground electrode tip 39, the ground electrode body 31, and the weld part 35, on the joint end 312 side with respect to the ground electrode tip 39. Thus, the structure serves to efficiently conduct the heat from the ground electrode tip 39 to the metal shell 50 via the ground electrode body 31, and thereby improve the heat-dissipation ability of the spark plug 100.

Also, according to the present embodiment, in the virtual plane VS, the area DS is formed between every two adjacent projecting portions such as the projecting portions Ta and Tb, or Tb and Tc. In the areas DS, the ground electrode tip 39 and the ground electrode body 31 overlap with each other and are in direct contact with each other without sandwiching the weld part 35 therebetween. This further serves to suppress the volume of the weld part 35 and therefore suppress the occurrence of welding drop.

Furthermore, according to the present embodiment, the peaks Pa to Pe of the projecting portions Ta to Te in the specific direction (second direction D2) overlap with the ground electrode body 31, but do not overlap with the ground electrode tip 39. Accordingly, the ground electrode tip 39 and the ground electrode body 31 are welded via a sufficient length of the weld part 35 in the specific direction, and therefore have sufficient contact areas with the weld part 35, while leaving the areas DS in which the ground electrode tip 39 and the ground electrode body 31 are in direct contact with each other. This further serves to enhance the strength of joint between the ground electrode tip 39 and the ground electrode body 31 while suppressing the occurrence of welding drop.

Moreover, according to the present embodiment, in the virtual plane VS, the four corners AG of the rectangular ground electrode tip 39 overlap with the weld part 35, wherein the corners AG are likely to be starting points of detachment of the ground electrode tip 39. This further serves to enhance the strength of joint between the ground electrode tip 39 and the ground electrode body 31.

In general, out of the four corners AG, the two corners AG at the specific direction (second direction D2) side are relatively difficult to weld, because they are located on the side of the ground electrode tip 39 farther from a laser irradiation source. However, according to the present embodiment, these two corners AG are allowed to overlap with the weld part 35 and be welded to the weld part 35, wherein these two corners AG are likely to be starting points of detachment of the ground electrode tip 39 as well as the remaining two corners AG. This significantly serves to enhance the strength of joint between the ground electrode tip 39 and the ground electrode body 31.

Furthermore, according to the present embodiment, in the virtual plane VS, regarding every pair of two adjacent projecting portions out of the five projecting portions Ta to Te, the second line segment is longer than the first line segment. Specifically, regarding the pair of the projecting portions Ta and Tb, the pair of the projecting portions Tb and Tc, the pair of the projecting portions Tc and Td, and the pair of the projecting portions Td and Te, the lengths Ba to Bd of the second line segments L2a to L2d are respectively longer than the lengths Aa to Ad of the first line segments. Namely, the structure satisfies mathematical expressions of Ba>Aa, Bb>Ab, Bc>Ac, and Bd>Ad. This serves to enhance complexity of the shapes of the contact areas among the ground electrode tip 39, the ground electrode body 31, and the weld part 35, and effectively enhance the strength of joint between the ground electrode tip 39 and the ground electrode body 31 while suppressing the occurrence of welding drop.

<Variations of Exemplary Embodiment>

Figure 6:
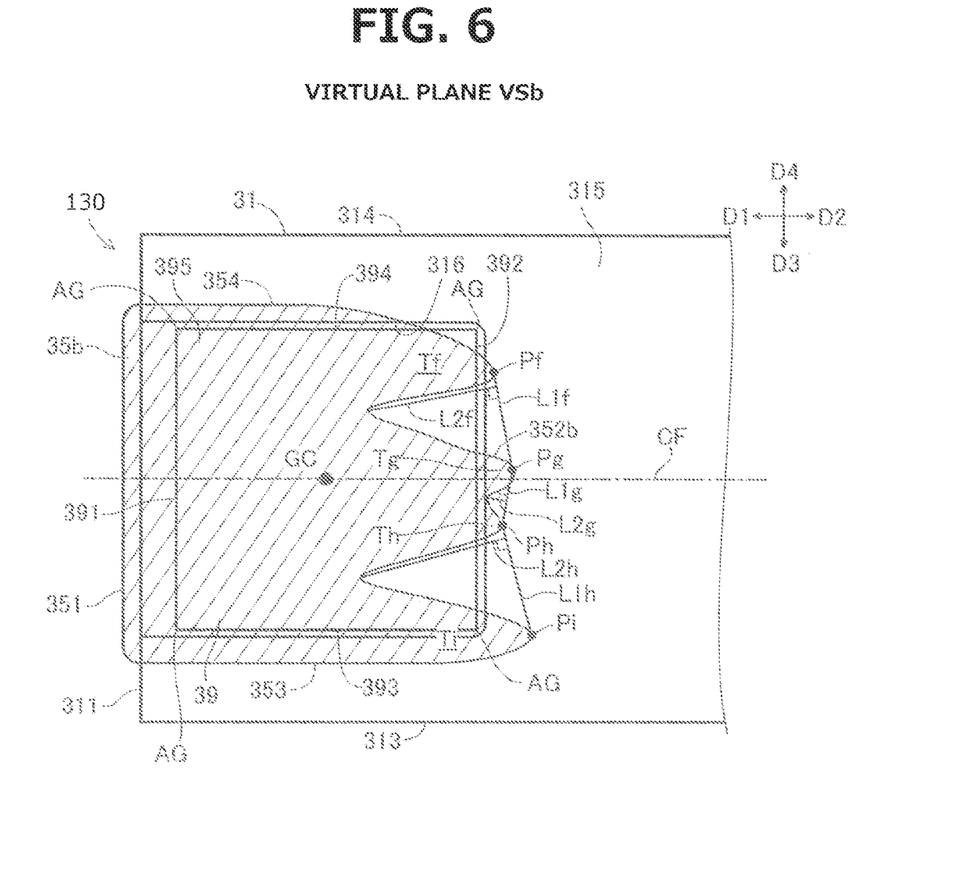
FIG. 6 is a view showing a virtual plane VSb of a ground electrode 130 according to a first variation of the exemplary embodiment.

(1) FIG. 6 shows a virtual plane VSb of a ground electrode 130 according to a first variation of the exemplary embodiment. In this variation, the ground electrode 130 includes a weld part 35b instead of the weld part 35, wherein the weld part 35b is different in structure from the weld part 35 according to the embodiment shown in FIGS. 2A and 2B. The virtual plane VSb in FIG. 6 is a virtual plane perpendicular to the axial direction of the spark plug 100, onto which the weld part 35b, the ground electrode tip 39, and the ground electrode body 31 are projected in the layering direction of the ground electrode tip 39 and the ground electrode body 31 (i.e. in the axial direction of the spark plug 100).

In the virtual plane VSb, the weld part 35b includes an outer edge 352b in the second direction D2, wherein the edge 352b has a wavy shape in a vicinity of the surface 392 of the ground electrode tip 39. In other words, the weld part 35b includes a plurality of projecting portions Tf to Ti at the second direction D2 side, wherein the projecting portions Tf to Ti extend in the specific direction (second directions D2) parallel to the virtual plane VSb and are arranged in the third direction D3. In FIG. 6, points Pf to Pi are peaks of the projecting portions Tf to Ti in the second direction D2.

The four projecting portions Tf to Ti include three pairs of adjacent two projecting portions, namely, a pair of the projecting portions Tf and Tg, a pair of the projecting portions Tg and Th, and a pair of the projecting portions Th and Ti. For these three pairs, first line segments L1f to L1h and second line segments L2f to L2h are defined as shown in FIG. 6. The first line segments L1f to L1h respectively have lengths Af to Ah. The second line segments L2f to L2h respectively have lengths Bf to Bh.

Regarding the pair of the projecting portions Tf and Tg, the length Bf of the second line segment L2f is greater than the length Af of the first line segment L1f. Namely, this pair satisfies a mathematical expression of Bf>Af. Similarly, regarding the pair of the projecting portions Th and Ti, the length Bh of the second line segment L2h is greater than the length Ah of the first line segment L1h. Namely, this pair satisfies a mathematical expression of Bh>Ah.

On the other hand, regarding the pair of the projecting portions Tg and Th, the length Bg of the second line segment L2g is less than the length Ag of the first line segment L1g. Namely, this pair does not satisfy a mathematical expression of Bg>Ag Like this, not all pairs of adjacent two projecting portions are required to satisfy corresponding mathematical expressions of B>A, wherein A is the length of the first line segment and B is the length of the second line segment. It is sufficient that at least one pair of adjacent two projecting portions satisfies the mathematical expression of B>A.

In the virtual plane VSb, the ground electrode tip 39 has the rectangular shape having the four corners AG. In FIG. 6, out of the four corners AG, the upper right corner does not overlap with the weld part 35b and the other three corners overlap with the weld part 35b Like this, all or part of the four corners AG of the ground electrode tip 39 may be apart from the weld part in the virtual plane.

Figure 7:
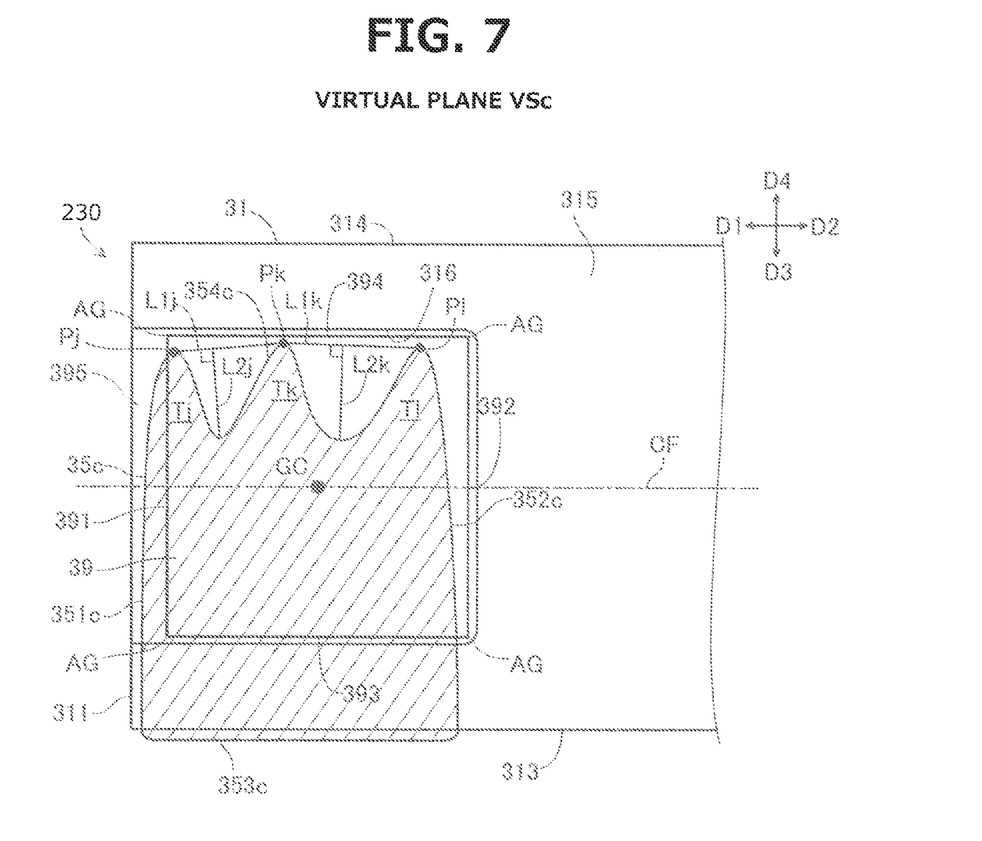
FIG. 7 is a view showing a virtual plane VSc of a ground electrode 230 according to a second variation of the exemplary embodiment.

(2) FIG. 7 shows a virtual plane VSc of a ground electrode 230 according to a second variation of the exemplary embodiment. In this variation, the ground electrode 230 includes a weld part 35c instead of the weld part 35, wherein the weld part 35c is different in structure from the weld part 35 according to the embodiment shown in FIGS. 2A and 2B. The virtual plane VSc in FIG. 7 is a virtual plane perpendicular to the axial direction, onto which the weld part 35c, the ground electrode tip 39, and the ground electrode body 31 are projected in the layering direction (i.e. in the axial direction of the spark plug 100).

In the virtual plane VSc, the weld part 35c includes an outer edge 353c in the third direction D3, wherein the edge 353c is exposed to the outside at the surface 313 of the ground electrode body 31 in the third direction D3. Other three outer edges of the weld part 35c, i.e. edges 351c, 352c, and 354c of the weld part 35c in the directions D1, D2, and D4, are not exposed to the outside at any side surfaces of the ground electrode body 31. This structure is formed by implementing the formation of the weld part 35c based on laser welding by directing a laser beam from the third direction D3 side of the surface 313 in the fourth direction D4, in contrast to the basic form of the exemplary embodiment.

In the virtual plane VSc, the edge 352c of the weld part 35c in the second direction D2 is formed along the surface 392 of the ground electrode tip 39 in the second direction D2, and has no wavy shape in contrast to the basic form of the exemplary embodiment. Instead, the edge 354c of the weld part 35c in the fourth direction D4 has a wavy shape in a vicinity of the surface 394 of the ground electrode tip 39 in the fourth direction D4. In other words, the weld part 35c includes a plurality of projecting portions Tj to Tl at the fourth direction D4 side, wherein the projecting portions Tj to Tl extend in the specific direction (fourth direction D4) parallel to the virtual plane VSc, and are arranged in the second direction D2. In FIG. 7, points Pj to Pl are peaks of the projecting portions Tj to Tl in the fourth direction D4.

The three projecting portions Tj to Tl include two pairs of adjacent two projecting portions, namely, a pair of the projecting portions Tj and Tk, and a pair of the projecting portions Tk and Tl. For these two pairs, first line segments L1j and L1k and second line segments L2j and L2k are defined as shown in FIG. 7. The first line segments L1j and L1k respectively have lengths Aj and Ak. The second line segments L2j and L2k respectively have lengths Bj and Bk.

Regarding the pair of the projecting portions Tj and Tk, the length Bj of the second line segment L2j is greater than the length Aj of the first line segment L1j. Namely, this pair satisfies a mathematical expression of Bj>Aj. Regarding the pair of the projecting portions Tk and Tl, the length Bk of the second line segment L2k is greater than the length Ak of the first line segment L1k. Namely, this pair satisfies a mathematical expression of Bk>Ak.

In the virtual plane VSc, the fourth direction D4 (i.e. the upward direction in FIG. 7) is not directed toward the joint end 312 of the ground electrode body 31, wherein the fourth direction D4 is the specific direction in which the projecting portions Tj to Tl extend Like this, the specific direction in which the projecting portions Tj to Tl extend may be set different from the direction toward the joint end 312.

Furthermore, in the virtual plane VSc, the peaks Pj to Pl of the projecting portions Tj to Tl are located on the third direction D3 side with respect to the surface 394 of the ground electrode tip 39, wherein the surface 394 is an end of the ground electrode tip 39 in the fourth direction D4. Thus, the peaks Pj to Pl overlap with both of the ground electrode body 31 and the ground electrode tip 39. Like this, the peaks Pj to Pl of the projecting portions Tj to Tl may be structured to overlap with not only the ground electrode body 31 but also the ground electrode tip 39.

Moreover, in the virtual plane VSc, the ground electrode tip 39 has the rectangular shape having the four corners AG. In FIG. 7, out of the four corners AG, the lower left one overlaps with the weld part 35c and the other three do not overlap with the weld part 35c.

(3) According to the exemplary embodiment, each of the pair of the projecting portions Ta and Tb, the pair of the projecting portions Tb and Tc, the pair of the projecting portions Tc and Td, and the pair of the projecting portions Td and Te has the area DS therebetween, wherein the ground electrode tip 39 and the ground electrode body 31 overlap with each other in the areas DS. As a variation of the present embodiment, no such area DS may be defined between each pair of two adjacent projecting portions. For example, the ground electrode tip 39 may be in contact with the weld part 35 via an entire surface of the ground electrode tip 39 in the frontward direction FD, so that the ground electrode tip 39 and the ground electrode body 31 are not in direct contact with each other. In this structure, the layering direction of the ground electrode tip 39 and the ground electrode body 31 may be figured as a direction perpendicular to the second discharge surface 395 of the ground electrode tip 39, for example.

Figure 8:
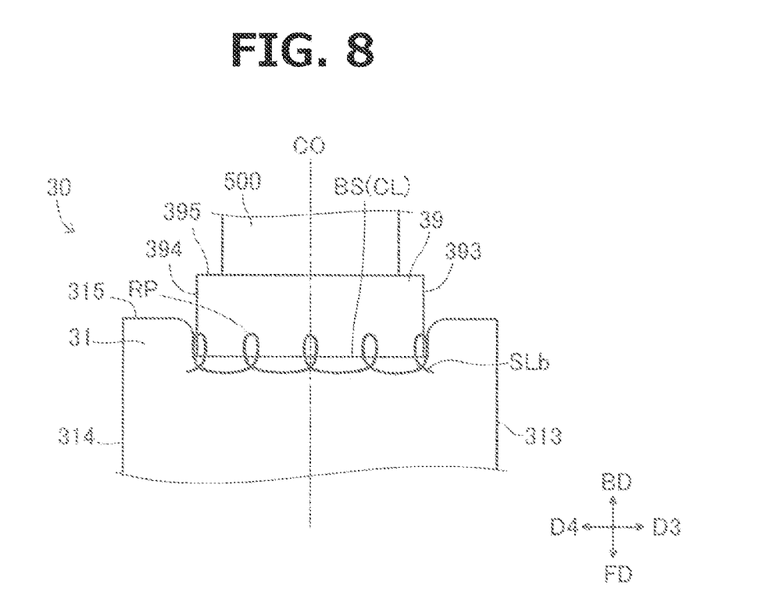
FIG. 8 is an illustrative view showing a scan line SLb for a part to be irradiated with a laser beam, according to a variation of the exemplary embodiment.

(4) FIG. 8 shows a scan line SLb for a part to be irradiated with the laser beam of the laser welding, as a variation of the exemplary embodiment. According to the basic form of the exemplary embodiment, the laser beam is delivered along the scan line SL in FIG. 5B to form the weld part 35. However, the weld part 35 may be formed differently. According to the present variation, the laser beam moves along the scan line SLb at a constant speed with a constant output power (energy per unit time) during scanning. As shown in FIG. 8, the scan line SLb extends generally in the third direction D3 with five loop sections RP, wherein each loop section RP loops to have an elliptical shape and is located to correspond in position in the third direction D3 to a corresponding one of the five projecting portions Ta to Te in FIG. 2B. Accordingly, the tip contact line CL receives greater energy per unit length at the positions of the loop sections RP than at the positions of the remaining sections, in the third direction D3. This results in formation of the five projecting portions Ta to Te corresponding in position in the third direction D3 to the loop sections RP.

The formation of the five projecting portions Ta to Te in FIG. 2B may be implemented by an alternative operation of scanning the tip contact line CL linearly with the laser beam, while setting slower the travel speed of the laser beam at the positions where the five projecting portions Ta to Te are to be formed than at the positions of the remaining sections, in the third direction D3.

The formation of the five projecting portions Ta to Te in FIG. 2B may be implemented by another alternative operation of scanning the tip contact line CL linearly with the laser beam, while setting higher the output power of the laser beam at the positions where the five projecting portions Ta to Te are to be formed than at the positions of the remaining sections, in the third direction D3.

(5) According to the exemplary embodiment, the shape of the ground electrode tip 39 is rectangular as viewed in the axial direction. However, the shape is not so limited but may be a circle, pentagon, etc., as long as the projecting portions Ta to Te are formed at the second direction D2 side etc. of the weld part 35.

(6) The present invention may be applied to the center electrode 20 for welding the cylindrical-shaped center electrode tip 29 to the front end of the electrode leg portion 25 of the cylindrical-shaped center electrode body 21 by laser welding. For example, a weld part is formed between the center electrode tip 29 and the electrode leg portion 25 by irradiating a tip contact area therebetween with the laser beam in a specific direction parallel to the tip contact area, while forming a plurality of projecting portions at a specific direction side of the weld part 35, wherein the plurality of projecting portions extend in the specific direction.

The following summarizes features of the present embodiment.

<1>A spark plug (100) includes a ground electrode (30) and a center electrode (20), wherein: at least one of the ground electrode (30) and the center electrode (20), as a first electrode, includes an electrode body (31) an electrode tip (39) layered with the electrode body (31) in a layering direction (FD), and a weld part (35, 35b, 35c) formed between the electrode body (31) and the electrode tip (39); the weld part (35, 35b, 35c) has an orthogonal projection on a virtual plane (VS, VSb, VSc) perpendicular to the layering direction (FD), wherein the orthogonal projection includes a plurality of projecting portions (Ta-Tl) extending in a specific direction (D2; D4) and being arranged in a direction (D4; D2) perpendicular to the specific direction (D2; D4), wherein each of the plurality of projecting portions (Ta-Tl) includes a peak (Pa-Pe) in the specific direction (D2; D4); the weld part (35, 35b, 35c) satisfies a mathematical expression of B>A, where A represents a length of a first line segment (L1a-L1d, L1f-L1h, L1j, L1k), and B represents a length of a second line segment (L2a-L2d, L2f-L2h, L2j, L2k); the first line segment (L1a-L1d, L1f-L1h, L1j, L1k) is a virtual line segment connecting the peak (Pa-Pe) of a first one of the plurality of projecting portions (Ta-Tl) to the peak (Pa-Pe) of a second one of the plurality of projecting portions (Ta-Tl) adjacent to the first projecting portion (Ta-Tl); and the second line segment (L2a-L2d, L2f-L2h, L2j, L2k) is a virtual line segment that is perpendicular to the first line segment (L1a-L1d, L1f-L1h, L1j, L1k) and connects the first line segment (L1a-L1d, L1f-L1h, L1j, L1k) to a point of an outer periphery of the weld part (35, 35b, 35c), wherein the point is farthest from the first line segment (L1a-L1d, L1f-L1h, L1j, L1k) in a section between the peaks (Pa-Pe) of the first and second projecting portions (Ta-Tl) facing the first line segment (L1a-L1d, L1f-L1h, L1j, L1k). This configuration serves to enhance complexity of shapes of contact areas between the weld part (35, 35b, 35c) and the electrode body (31) and between the weld part (35, 35b, 35c) and the electrode tip (39), and increase sizes of the contact areas without an excessive increase in volume of the weld part (35, 35b, 35c), and thereby enhance strength of joint between the electrode tip (39) and the electrode body (31) while suppressing occurrence of welding drop.

<2> The spark plug (100) according to the above feature<1>, further includes a metal shell (50), wherein: the first electrode is the ground electrode (30); the electrode body (31) is a rod-shaped member including a first end as a joint end (312) joined to the metal shell (50) and a second end being a free end (311); and the joint end (312) of the electrode body (31) has an orthogonal projection on the virtual plane (VS, VSb) toward which the specific direction (D2) is directed from the orthogonal projection of the weld part (35, 35b, 35c). This feature serves to increase the sizes of contact areas among the electrode tip (39), the electrode body (31), and the weld part (35, 35b, 35c), on the joint end (312) side with respect to the electrode tip (39), and thereby improve heat-dissipation ability of the spark plug (100).

<3> The spark plug (100) according to the above feature<1> or <2> is further configured such that the electrode body (31) and the electrode tip (39) have respective orthogonal projections on the virtual plane (VS, VSb, VSc), wherein the orthogonal projection of the electrode body (31) and the orthogonal projection of the electrode tip (39) overlap with each other in an area (DS) formed between the first and second projecting portions (Ta-Tl). This feature brings the electrode body (31) and the electrode tip (39) into direct contact without sandwiching the weld part (35, 35b, 35c) therebetween, and further serves to suppress the volume of the weld part (35, 35b, 35c) and thereby suppress the occurrence of welding drop.

<4> The spark plug (100) according to the above feature<3> is further configured such that at least one of the peaks (Pa-Pe) of the first and second projecting portions (Ta-Tl) overlaps with the orthogonal projection of the electrode body (31) and is apart from the orthogonal projection of the electrode tip (39). This feature serves to provide sufficient contact areas among the electrode tip (39), the electrode body (31), and the weld part (35, 35b, 35c), while leaving areas (DS) in which the electrode tip (39) and the electrode body (31) are in direct contact with each other, and thereby further enhance the joint strength while suppressing the occurrence of welding drop.

<5> The spark plug (100) according to the above feature<4> is further configured such that the orthogonal projection of the electrode tip (39) has a rectangular shape including at least one corner (AG) overlapping with the orthogonal projection of the weld part (35, 35b, 35c). This feature serves to further enhance the joint strength by welding at least one corner (AG) likely to be a starting point of detachment of the electrode tip (39) as well as the remaining three corners (AG).

<6> The spark plug (100) according to the above feature<5> is further configured such that four corners (AG) of the rectangular shape include two corners that are in the specific direction (D2) from the remaining two corners and overlap with the orthogonal projection of the weld part (35). This feature serves to further enhance the joint strength by welding two corners (AG) likely to be starting points of detachment of the electrode tip (39) as well as the remaining two corners (AG).

<7> The spark plug (100) according to any one of the above features <1>-<6> is further configured such that the mathematical expression of B>A is satisfied for every pair of adjacent two of the plurality of projecting portions (Ta-Te, Tj-Tl) as the first and second projecting portions. This feature more effectively serves to enhance the joint strength while suppressing the occurrence of welding drop.

The art described above can be embodied in various aspects such as a spark plug, an ignition apparatus using the spark plug, an internal combustion engine mounting the spark plug thereon, an electrode of the spark plug, a process for welding an electrode tip on the electrode of the spark plug, and a process for producing the electrode of the spark plug.

The entire contents of Japanese Patent Application 2018-022598 filed Feb. 10, 2018 are incorporated herein by reference.

Although the present invention has been described with reference to the present embodiment and its variations, the present embodiment and its variations are intended to facilitate understanding of the present invention and are not intended to limit the present invention thereto. Various changes and modifications may be made to the present embodiment and its variations without departing from the scope of the present invention. The present invention includes equivalents thereof.

Having described the invention, the following is claimed:

1. A spark plug comprising:
    a ground electrode and
    a center electrode
    wherein at least one of the ground electrode and the center electrode, as a first electrode, includes:
        an electrode body
        an electrode tip layered with the electrode body in a layering direction; and
        a weld part formed between the electrode body and the electrode tip;
    the weld part has an orthogonal projection on a virtual plane perpendicular to the layering direction, wherein the orthogonal projection includes a plurality of projecting portions extending in a specific direction and being arranged in a direction perpendicular to the specific direction, wherein each of the plurality of projecting portions includes a peak in the specific direction;
    the weld part satisfies a mathematical expression of B>A, where A represents a length of a first line segment, and B represents a length of a second line segment;
    the first line segment is a virtual line segment connecting the peak of a first one of the plurality of projecting portions to the peak of a second one of the plurality of projecting portions adjacent to the first projecting portion; and
    the second line segment is a virtual line segment that is perpendicular to the first line segment and connects the first line segment to a point of an outer periphery of the weld part, wherein the point is farthest from the first line segment in a section between the peaks of the first and second projecting portions facing the first line segment.

2. The spark plug according to claim 1, further comprising a metal shell, wherein:
    the first electrode is the ground electrode;
    the electrode body is a rod-shaped member including a first end as a joint end joined to the metal shell and a second end being a free end; and
    the joint end of the electrode body has an orthogonal projection on the virtual plane toward which the specific direction is directed from the orthogonal projection of the weld part.

3. The spark plug according to claim 2, wherein the electrode body and the electrode tip have respective orthogonal projections on the virtual plane, wherein the orthogonal projection of the electrode body and the orthogonal projection of the electrode tip overlap with each other in an area formed between the first and second projecting portions.

4. The spark plug according to claim 3, wherein at least one of the peaks of the first and second projecting portions overlaps with the orthogonal projection of the electrode body and is apart from the orthogonal projection of the electrode tip.

5. The spark plug according to claim 4, wherein the orthogonal projection of the electrode tip has a rectangular shape including at least one corner overlapping with the orthogonal projection of the weld part.

6. The spark plug according to claim 5, wherein four corners of the rectangular shape include two corners that are in the specific direction from the remaining two corners and overlap with the orthogonal projection of the weld part.

7. The spark plug according to claim 1, wherein the mathematical expression of B>A is satisfied for every pair of adjacent two of the plurality of projecting portions as the first and second projecting portions.

8. The spark plug according to claim 1, wherein the electrode body and the electrode tip have respective orthogonal projections on the virtual plane, wherein the orthogonal projection of the electrode body and the orthogonal projection of the electrode tip overlap with each other in an area formed between the first and second projecting portions.

9. The spark plug according to claim 8, wherein at least one of the peaks of the first and second projecting portions overlaps with the orthogonal projection of the electrode body and is apart from the orthogonal projection of the electrode tip.

10. The spark plug according to claim 9, wherein the orthogonal projection of the electrode tip has a rectangular shape including at least one corner overlapping with the orthogonal projection of the weld part.

11. The spark plug according to claim 10, wherein four corners of the rectangular shape include two corners that are in the specific direction from the remaining two corners and overlap with the orthogonal projection of the weld part.

12. The spark plug according to claim 8, wherein the mathematical expression of B>A is satisfied for every pair of adjacent two of the plurality of projecting portions as the first and second projecting portions.

* * * * *